(12) United States Patent
Malone et al.

(10) Patent No.: US 12,207,576 B2
(45) Date of Patent: Jan. 28, 2025

(54) ATTACHMENT FOR A TOWBAR OF A TOWABLE APPARATUS

(71) Applicant: Michael Frederick Malone, Claremorris (IE)

(72) Inventors: Michael Frederick Malone, Claremorris (IE); Oliver James Fair, Castlebar (IE)

(73) Assignee: Michael Fredrick Malone, Claremorris (IE)

( * ) Notice: Subject to any disclaimer, the term of this patent is extended or adjusted under 35 U.S.C. 154(b) by 877 days.

(21) Appl. No.: 17/186,655

(22) Filed: Feb. 26, 2021

(65) Prior Publication Data

US 2021/0267113 A1    Sep. 2, 2021

(30) Foreign Application Priority Data

Mar. 2, 2020   (IE) .................................... 2020/0039

(51) Int. Cl.
| | |
|---|---|
| *A01B 59/043* | (2006.01) |
| *A01B 59/042* | (2006.01) |
| *A01B 71/06* | (2006.01) |
| *B60D 1/07* | (2006.01) |

(52) U.S. Cl.
CPC .......... *A01B 59/043* (2013.01); *A01B 59/042* (2013.01); *A01B 71/06* (2013.01); *B60D 1/07* (2013.01)

(58) Field of Classification Search
CPC ..... A01B 59/042; A01B 59/043; A01B 71/06; B60D 1/06; B60D 1/07
See application file for complete search history.

(56) References Cited

U.S. PATENT DOCUMENTS

| | | | | |
|---|---|---|---|---|
| 4,366,877 A | * | 1/1983 | Vissers ................ | A01B 71/066 172/47 |
| 4,525,987 A | * | 7/1985 | Werner ................... | F16H 3/001 56/2 |
| 4,738,461 A | * | 4/1988 | Stephenson .......... | A01B 71/066 180/14.4 |
| 5,647,604 A | * | 7/1997 | Russell ................... | B60D 1/04 280/492 |
| 5,706,901 A | * | 1/1998 | Walters ................ | A01B 71/066 180/53.1 |

(Continued)

*Primary Examiner* — Adam J Behrens
*Assistant Examiner* — Blake E Scoville
(74) *Attorney, Agent, or Firm* — Sughrue Mion, PLLC

(57) ABSTRACT

An attachment (1) for attaching to a towbar (3) of a towable apparatus (5), for example, a mower for hitching the towable apparatus (5) to either an agricultural tractor or a road vehicle comprises a mounting shaft (10) for securing to the towbar (3), and carrying a first gearbox (12). A second gearbox (14) is pivotally coupled to the first gearbox (12) about a vertical pivot axis (15) through which drive is transmitted from the second gearbox (14) to the first gearbox (12). A carrier housing (24) is rigidly secured to the second gearbox (14) and carries a first hitch (30) for hitching to a complementary hitch mechanism of a road vehicle, and a second hitch (38) for coupling a tractor (7). The second gearbox (14) is pivotal relative to the first gearbox (14) about the main pivot axis (15) between a first state with the first hitch (30) ready for hitching to the road vehicle, and a second state with the second hitch (38) ready for hitching to the tractor (7).

13 Claims, 4 Drawing Sheets

(56) References Cited

U.S. PATENT DOCUMENTS

| | | | | |
|---|---|---|---|---|
| 6,412,570 B1* | 7/2002 | Pruitt | ............... | A01B 71/066 172/449 |
| 7,308,947 B2* | 12/2007 | Barnett | ............... | A01B 71/066 180/53.3 |
| 8,469,386 B2* | 6/2013 | Clark | ............... | A01B 71/066 172/450 |
| 8,899,608 B2* | 12/2014 | DeLisio | ............... | B60D 1/07 280/416.1 |

* cited by examiner

ATTACHMENT FOR A TOWBAR OF A TOWABLE APPARATUS

FIELD OF THE INVENTION

The present invention relates to an attachment for a towbar of a towable apparatus for attaching the towbar to a towing vehicle, and the invention also relates to a towbar of a towable apparatus comprising the attachment. Additionally, the invention relates to a towable apparatus comprising a towbar having the attachment attached thereto.

BACKGROUND TO THE INVENTION

Agricultural apparatus and machines, in general, are configured for towing by a prime mover, typically, by an agricultural tractor. Such agricultural apparatus and machines may comprise a mower, for mowing grass or hay, a baler, for baling fodder material and producing either round or square bales, a bale wrapper for wrapping such bales, a combined baler/bale wrapper, a slurry spreader, a trailer and many other such towable machines and vehicles. In general, such towable apparatus are configured for hitching to an agricultural tractor, and in general, comprise a towbar which terminates in a suitable hitch for hitching to the hitch of an agricultural tractor. Typically, the towbar of such towable apparatus terminates in a hitch configured for coupling to the lower arms of a three-point linkage. Such hitching arrangements in such towable apparatus, while they are suitable for hitching to an agricultural tractor, they are unsuitable for hitching to a road vehicle, such as, a pickup truck or a "four-by-four" road vehicle. There are many occasions where it is necessary to tow such towable apparatus from one location to another on a public road or a public highway, for example, from one farm to another farm. In general, where the distance between the two locations is relatively short, it is feasible to tow such towable apparatus along a public road by an agricultural tractor. However, due to the relatively low top speed of an agricultural tractor, when the distance between the locations is relatively long, in general, it is no longer feasible to tow such towable apparatus along a public road by an agricultural tractor. In such cases, it is necessary to hitch the towable apparatus to a road vehicle, for example, a pickup truck or a four-by-four road vehicle.

Unfortunately, the hitch mechanisms provided on such road vehicles are not compatible with the hitches of such towable apparatus, and in particular, towable agricultural apparatus. Accordingly, this requires the physical replacement of the standard hitch on the towable apparatus with a hitch suitable for hitching to the hitch mechanism of a road vehicle, for example, a pickup truck. This, entails physically dismantling the standard hitch mechanism from the towbar of the towable apparatus, and then physically replacing it with a hitch suitable for hitching to the hitch mechanism of the pickup truck. Such dismantling of the standard hitch of a towable vehicle and replacing it with a hitch adapted for hitching to the hitch mechanism of a road vehicle pickup truck or is a cumbersome operation, and a particularly time consuming operation, which also requires a reasonable degree of expertise.

There is therefore a need for providing an attachment for a towbar of a towable apparatus which addressed this problem.

The present invention is directed towards providing such an attachment, and the invention is also directed towards providing a towbar comprising the attachment, and further, the invention is directed towards providing a towable apparatus comprising a towbar and the attachment.

SUMMARY OF THE INVENTION

According to the invention there is provided an attachment for a towbar of a towable apparatus, the attachment comprising a first element configured for securing to the towbar, a second element pivotally coupled to the first element about a main pivot axis, a first hitch carried on the second element, the first hitch being configured for hitching to a first type of a towing vehicle, and a second hitch carried on the second element, the second hitch being different to the first hitch and being configured for hitching to a second type of towing vehicle different to the first type of towing vehicle, the second element being pivotal relative to the first element about the main pivot axis for alternately presenting the first and second hitches in respective operable states for hitching to the respective first and second types of towing vehicles.

In one embodiment of the invention the second element is pivotal relative to the first element about the main pivot axis between a first state with the first hitch in the operable state, and a second state with the second hitch in the operable state.

Preferably, the second element is pivotal relative to the first element about the main pivot axis through a rotational angle of approximately 180° between the first and second states.

In one embodiment of the invention a latch is provided for latching the second element relative to the first element in one of the first and second states, and preferably, the latch is configured for latching the second element relative to the first element in the first state thereof.

In another embodiment of the invention a main drive transmission extends between the first element and the second element for transmitting drive from the second element to the first element.

In another embodiment of the invention the main drive transmission defines a drive transmission axis, which preferably coincides with the main pivot axis.

In another embodiment of the invention the main drive transmission comprises a main drive shaft, and preferably, the main drive shaft defines the drive transmission axis.

In one embodiment of the invention the second element is configured for receiving drive from a towing vehicle, and preferably, from a power-take-off shaft of a towing vehicle, and advantageously, the first element is configured for transmitting the drive from the second element to the towable apparatus.

In another embodiment of the invention the first element comprises a first gearbox, and preferably, the second element comprises a second gearbox, and advantageously, the main drive shaft extends between the first and second gearboxes.

In another embodiment of the invention the first gearbox comprises a first right-angle drive gearbox, and in another embodiment of the invention the second gearbox comprises a second right-angle drive gearbox.

In a further embodiment of the invention the second element is pivotal about the main pivot axis through at least 180°, and in another embodiment of the invention the second gearbox is rotatable relative to the first gearbox about the main pivot axis through 360°.

In one embodiment of the invention the first hitch is configured for hitching to a road vehicle, and in another embodiment of the invention the first hitch comprises a socket-hitch for engaging a corresponding ball-hitch of the first type of towing vehicle, such as a road vehicle. Alternatively, the first hitch comprises one or a pair of spaced apart hitch plates configured for coupling to a corresponding hitch mechanism of the first type of towing vehicle, such as a road vehicle, and preferably, for coupling to a hitch mechanism comprising a pair of spaced apart corresponding hitch plates or to a single corresponding hitch plate extending from the first type of towing vehicle, with the single hitch plate of the first hitch located between the pair of spaced apart corresponding hitch plates of the hitch mechanism of the first type of towing vehicle, or the pair of hitch plates of the first hitch engaging the corresponding hitch plate of the first type of towing vehicle, with the corresponding hitch plate engaged between the pair of hitch plates of the first hitch. Preferably, the one or the pair of spaced apart hitch plates of the first hitch are provided with respective hitch pin engaging bores for engaging a hitch pin for coupling the one or the spaced apart hitch plates to the hitch mechanism of the first type of towing vehicle.

In a further embodiment of the invention the first hitch is adjustably mounted to the second element, and preferably, is adjustably mounted in a generally upwardly and downwardly direction relative to the second element for adjusting the height of the first hitch relative to the attachment.

In another embodiment of the invention the second hitch is configured for hitching to the second type of towing vehicle in the form of an agricultural vehicle, and preferably, the second hitch comprises a pair of spaced apart couplers for coupling to respective lower lift arms of a three-point linkage of the towing vehicle of the second type thereof.

Preferably, the couplers are carried on a transversely extending carrier shaft, and advantageously, the carrier shaft is pivotally coupled to the second element intermediate its ends, and preferably, the carrier shaft is pivotally coupled to the second element substantially midway between the two couplers carried on the carrier shaft.

In one embodiment of the invention the pivotal coupling of the carrier shaft to the second element defines a carrier pivot axis, and preferably, the carrier pivot axis extends perpendicularly to the main pivot axis, and advantageously, intersects the main pivot axis.

Preferably, the carrier pivot axis extends substantially horizontally, and advantageously, extends transversely of the carrier shaft.

In another embodiment of the invention the carrier pivot axis extends substantially perpendicularly to the carrier shaft, and advantageously, the carrier shaft extends transversely to the direction of normal forward travel of the towable apparatus.

Preferably, the main pivot axis extends substantially vertically.

In one embodiment of the invention the second element is located below the first element.

In another embodiment of the invention the attachment comprises a mounting element for mounting the attachment to the towbar of a towable apparatus.

In another embodiment of the invention the mounting element comprises a shaft extending rearwardly from the first element, configured for securing to the towbar of the towable apparatus, and preferably, configured for securing on an underside of the towbar of the towable apparatus.

In another embodiment of the invention an elongated ground engaging support member is provided extending downwardly from the attachment, and preferably, the length of the ground engaging support member is adjustable for adjusting the height of the attachment above the ground.

In a further embodiment of the invention the ground engaging support member is coupled to the attachment, and preferably, is urgeable between an operable state extending downwardly from the attachment for engaging the ground and an inoperable state extending substantially parallel to a part of the attachment.

Preferably, the ground engaging support member is spaced apart rearwardly from the first element.

Preferably, the ground engaging support member is coupled to the mounting element.

Advantageously, the ground engaging support member comprises an elongated member, which preferably, comprises an elongated telescoping member having an inner member slideably mounted longitudinally in an outer elongated member with telescoping movement.

The invention also provides a towbar comprising the attachment according to the invention mounted thereon.

Additionally, the invention provides a towable apparatus comprising a towbar and the attachment according to the invention secured to the towbar.

In one embodiment of the invention the towable apparatus comprises a towable agricultural apparatus.

In another embodiment of the invention the towable apparatus comprises a towable trailer.

Advantages of the Invention

The advantages of the invention are many. The attachment according to the invention when secured to a towbar of a towable apparatus permits the towable apparatus to be readily hitchable to either a first type of towing vehicle, for example, a road vehicle with one type of hitch mechanism, and to a second type of towing vehicle, for example, an agricultural tractor with a different type of hitch mechanism to that of the first type of towing vehicle, without the need for dismantling one type of hitch on the towbar of the towable apparatus and replacing it with a different type of hitch. The attachment according to the invention merely requires pivoting the second element relative to the first element between the first state with the first hitch operably presented for hitching to a first type of towing vehicle, and a second state with the second hitch operably presented for hitching to a second type of towing vehicle with a different type of hitch mechanism to that of the first type of towing vehicle. Accordingly, there is no need for an owner of a towable vehicle to carry a different type of hitch mechanism to that provided on the towbar of a towable apparatus for subsequent attachment to the towbar in the event of the need to tow the towable apparatus by a towing vehicle having an incompatible hitch mechanism to that of the hitch on the towbar of the towable apparatus. Additionally, there is no need for the physical dismantling and replacing of one type of hitch on a towbar of a towable apparatus with a different type of hitch in order to adapt the towable apparatus to be suitable for towing by a towing vehicle with a hitch mechanism which is incompatible to that of the towable apparatus.

BRIEF DESCRIPTION OF THE DRAWINGS

The invention will be more clearly understood from the following description of a preferred embodiment thereof which is given by way of example only with reference to the accompanying drawings, in which.

DETAILED DESCRIPTION OF THE INVENTION

Figure 1:
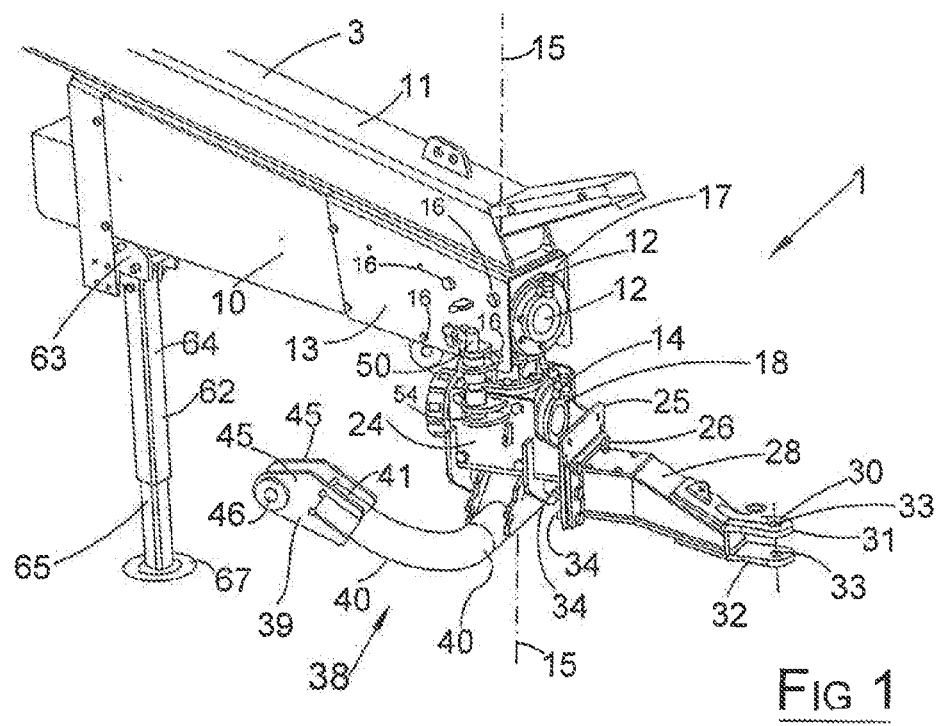
FIG. 1 is a perspective view of an attachment according to the invention for a towbar of a towable apparatus.

Referring to the drawings there is illustrated an attachment according to the invention indicated generally by the reference numeral 1 for securing to a towbar 3 also according to the invention of a towable apparatus also according to the invention indicated generally by the reference numeral 5, which in this embodiment of the invention is illustrated as an agricultural machine, namely, a mower. The towable apparatus 5, which is according to the invention when fitted with the attachment 1, may be any towable apparatus, such as, a trailer or any other agricultural machinery, such as a baler for bailing fodder material which may produce round, square or rectangular bales, a bale wrapper for wrapping bales of fodder material, a combined baler/bale wrapper for producing wrapped bales of fodder material which may be round, square or rectangular bales, a slurry spreader, or any other type of towable machine or vehicle.

The attachment 1, as will be described below, is configured for selectively and alternately hitching to a first type of towing vehicle, for example, a road vehicle, such as, a pickup truck or a four-by-four road vehicle, neither of which are illustrated, and which would typically be provided with a single hitch point, and to a second type of towing vehicle, for example, an agricultural vehicle, such as, a tractor 7, whereby the attachment 1 is configurable for hitching to the lower lift arms 9 of a three-point linkage of the tractor 7, or to a fixed hitch extending rearwardly from a tractor and centred in a transverse direction between the rear ground engaging wheels of the tractor.

Such towable apparatus with such towbars as the towbar 3, and such tractors with lower lift arms, such as the lift arms 9, or with centred rearwardly extending fixed hitches will be well known to those skilled in the art, and further description should not be required. Additionally, road vehicles, such as for example, pickup trucks and four-by-four road vehicles will also be well known to those skilled in the art as will the hitch mechanisms provided on such road vehicles. Typically, such hitch mechanisms of pickup trucks and four-by-four road vehicles may comprise a ball-hitch configured for engaging a socket-hitch of the towing vehicle. Alternatively, the hitch mechanisms of pickup trucks and four-by-four road vehicles may comprise a single hitch plate or a pair of vertically spaced apart hitch plates having a bore or respective aligned bores extending therethrough for engaging a hitch pin for hitching to a hitch plate or a pair of vertically spaced apart hitch plates having a corresponding bore or respective aligned bores extending therethrough of the towable apparatus. Accordingly, further descriptions of such road vehicles and their hitch mechanisms should not be required.

Turning now to the attachment 1, the attachment 1 comprises a mounting element, which in this embodiment of the invention comprises a mounting shaft 10 of hollow box section steel configured for mounting adjacent a distal end 11 of the towbar 3 of the towable apparatus 5 on the underside of the towbar 3 by bolts (not shown). The mounting shaft 10 carries a first element, in this embodiment of the invention comprising a first right-angle drive transmission gearbox 12 located in the mounting shaft 10 adjacent a forward end thereof. A second element, in this embodiment of the invention comprising a second right-angle drive transmission gearbox 14 is located beneath the first gearbox 12, and is pivotally coupled to the first gearbox 12 about a substantially vertically extending main pivot axis 15. The first gearbox 12 comprises a first housing 17 which is secured to the mounting shaft 10 by bolts 16 through side plates 13 of the mounting shaft 10, which engage threaded bores 43 in the first housing 17 of the first gearbox 12. The second gearbox 14 comprises a second housing 18.

Figure 6:
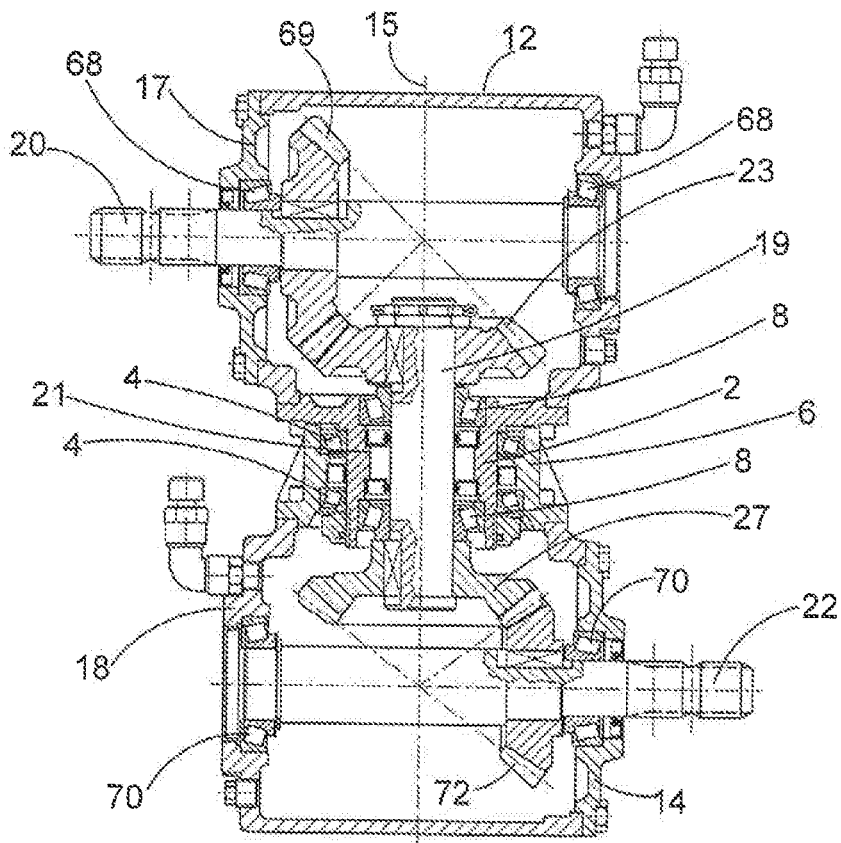
FIG. 6 is a cross-sectional side elevational view of a portion of the attachment of FIG. 1.
Figure 7:
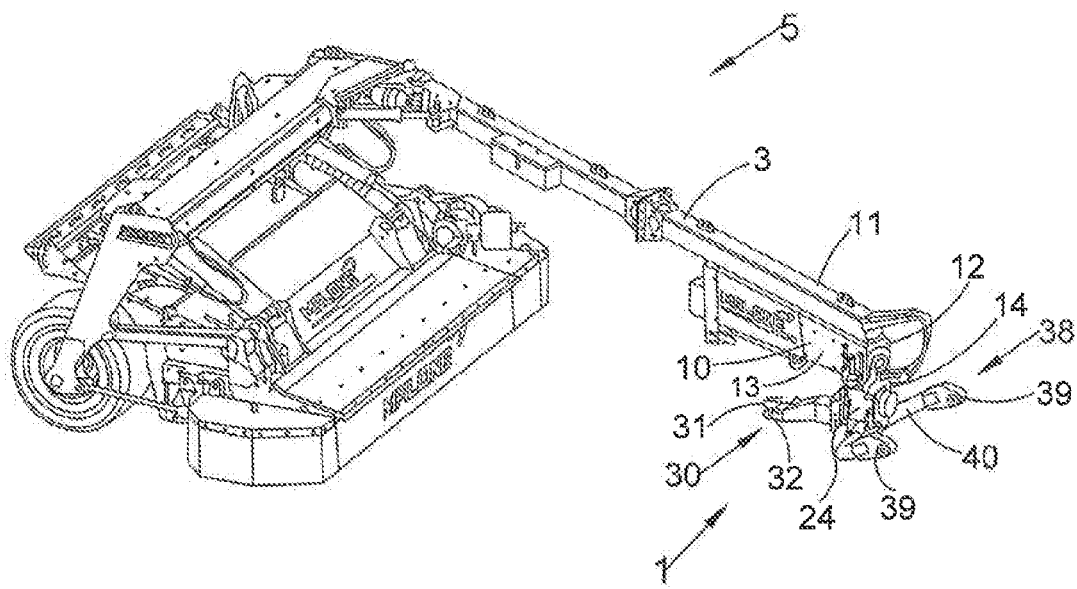
FIG. 7 is a perspective view of a towable apparatus, in this case, a mower with the attachment of FIG. 1 coupled to a towbar of the mower and with the attachment in the state of FIG. 2.

A neck 2 extending downwardly from the first housing 17 of the first gearbox 12 pivotally carries the second gearbox 14 about the main pivot axis 15 on a pair of vertically spaced apart bearings 4, which are located in a collar 6 extending upwardly from the second housing 18 of the second gearbox 14 around the neck 2 of the first gearbox 12, see FIG. 6. A main drive transmission, namely, a main drive transmission shaft 19 extending between the first gearbox 12 and the second gearbox 14 transmits drive from the second gearbox 14 to the first gearbox 12. The main drive shaft 19 is rotatably mounted in a bore 21 extending centrally through the neck 2 of the first gearbox 12 in a pair of vertically spaced apart bearings 8 located in the bore 21. The main drive shaft 19 defines a drive transmission axis, which coincides with the main pivot axis 15 about which the second gearbox 14 is pivotal relative to the first gearbox 12. The main drive shaft 19 terminates in the first gearbox 12 in a first gear 23 mounted fast on the main drive shaft 19. The main drive shaft 19 terminates in the second gearbox 14 in a second gear 27 also mounted fast on the main drive shaft 19.

A first splined shaft 20 rotatably carried in bearings 68 in the first gearbox 12 transmits drive from the first gearbox 12 to the towable apparatus 5, as will be described below. Drive from the first gear 23 on the main drive shaft 19 in the first gearbox 12 transmits drive to the first splined shaft 20 through a first transmission gear 69 mounted fast on the first splined shaft 20.

A second splined shaft 22 is rotatably mounted in the second gearbox 14 in bearings 70 and is configured for receiving drive from a power-take-off shaft (not shown) from the towing vehicle, namely, the tractor 7, typically, through a cardan shaft (not shown). Drive is transmitted from the second splined shaft 22 to the main drive shaft 19 through a second transmission gear 72 mounted fast on the second splined shaft 22. The second transmission gear 72 transmits drive from the second splined shaft 22 to the main drive shaft 19 through the second gear 27.

Figure 5:
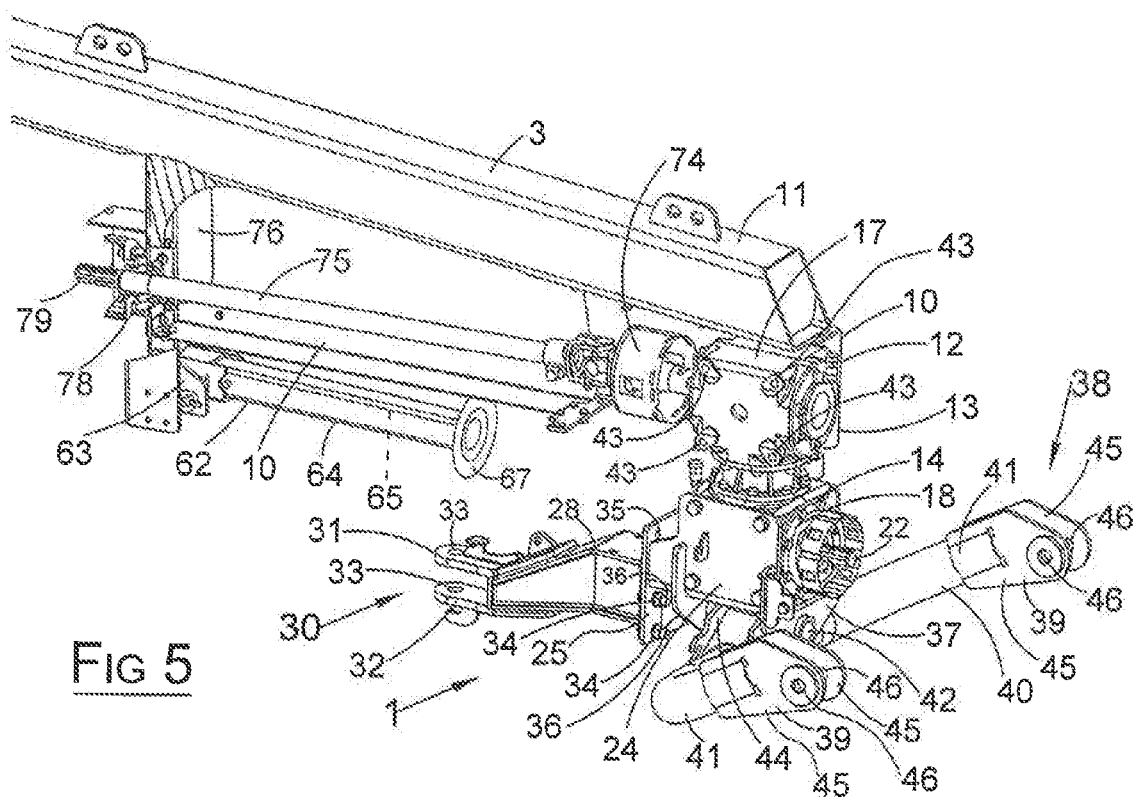
FIG. 5 is an enlarged partly cut-away perspective view of the attachment of FIG. 1.

Returning now to the first splined shaft 20, the first splined shaft 20 transmits drive to a friction clutch 74, through which drive from the first gearbox 12 is transmitted to an output drive shaft 75, see FIG. 5. The friction clutch 74 and the output drive shaft 75 are located in the mounting shaft 10, and the output shaft 75 extends through a rear end wall 76 to the rear of the mounting shaft 10. A bearing 78 located in the rear end wall 76 rotatably carries the output drive shaft 75. The output shaft 75 terminates in a splined end 79 for coupling to a transmission shaft, for example, a cardan shaft, for in turn transmitting drive to the towable apparatus 5.

Turning now to the second gearbox 14, the second gearbox 14 is rigidly mounted in a carrier housing 24. A first hitch 30 is adjustably coupled to the carrier housing 24 for hitching to a hitch mechanism of a road vehicle, such as a pickup truck or a four-by-four road vehicle. The carrier housing 24 comprises a main mounting plate 25 to which a secondary mounting plate 26 is adjustably coupled to the main mounting plate 25, as will be described below. A carrier arm 28 extends from the secondary mounting plate 26 and terminates in the first hitch 30. In this embodiment of the invention the first hitch 30 comprises a pair of substantially vertically spaced apart hitch plates, namely, an upper hitch plate 31 and a lower hitch plate 32 extending forwardly from the carrier arm 28 for engaging a corresponding hitch plate (not shown) of the hitch mechanism (also not shown) of the road vehicle between the upper and lower hitch plates 31 and 32. Aligned bores 33 extend through the upper and lower hitch plates 31 and 32 are alignable with a corresponding bore (not shown) in the corresponding hitch plate (also not shown) of the hitch mechanism of the road vehicle for receiving a hitch pin 29 therethrough. As discussed above, such hitch mechanisms on road vehicles such as pickup trucks and four-by-four road vehicle will be well known to those skilled in the art, and further description should not be necessary.

The main mounting plate 25 comprises four pairs of bores 35 which are engageable with bolts 36 through corresponding bores (not shown) in the secondary mounting plate 26 for securing the secondary mounting plate 26 to the main mounting plate 25, and in turn for securing the carrier arm 28 and the hitch plates 31 and 32 to the carrier housing 24. The secondary mounting plate 26 is provided with three pairs of the bores (not shown) while the main mounting plate 25 is provided with the four pairs of bores 35, permitting upward and downward adjustment of the secondary mounting plate 26 relative to the main mounting plate 25 for facilitating upward and downward adjustment of the carrier arm 28 relative to the carrier housing 24 for adjusting the height of the first hitch 30 to suite the height of the hitch mechanism of the road vehicle. Nuts 34 on the bolts 36 secure the secondary mounting plate 26 to the main mounting plate 25.

A pair of spaced apart downwardly extending main carrier brackets 37 extend downwardly from the carrier housing 24 and pivotally carry a second hitch 38 for hitching to the lower lift arms 9 of the agricultural tractor 7. The second hitch 38 comprises a pair of spaced apart couplers 39 which are carried at respective opposite ends 41 on a transversely extending carrier shaft 40. Each coupler 39 comprises a pair of spaced apart connecting plates 45 having respective aligned bores 46 extending therethrough for engaging connector pins 47 for coupling the couplers 39 to the respective lower lift arms 9 of the tractor 7. The coupling of such couplers as the couplers 39 to the lower lift arms of a tractor will be well known to those skilled in the art.

The carrier shaft 40 is pivotally coupled to and between the main carrier brackets 37 on a carrier pivot shaft 42. A pair of secondary carrier brackets 44 rigidly secured to the carrier shaft 40 are pivotally engaged by the carrier pivot shaft 42. The carrier pivot shaft 42 pivotally carries the carrier shaft 40 substantially midway between the two couplers 39, and defines a carrier pivot axis 49 extending horizontally and transversely of the carrier shaft 40, and intersects the vertically extending main pivot axis 15. The pivotal coupling of the carrier shaft 40 to the carrier housing 24 about the carrier pivot axis 49, facilitates pivoting of the attachment 1, and in turn the towable apparatus 5 relative to the agricultural tractor 7, in order to accommodate side-to-side tilting of the towable apparatus 5 relative to the tractor 7 as the towable apparatus 5 is being towed over uneven ground by the tractor 7.

Figure 2:
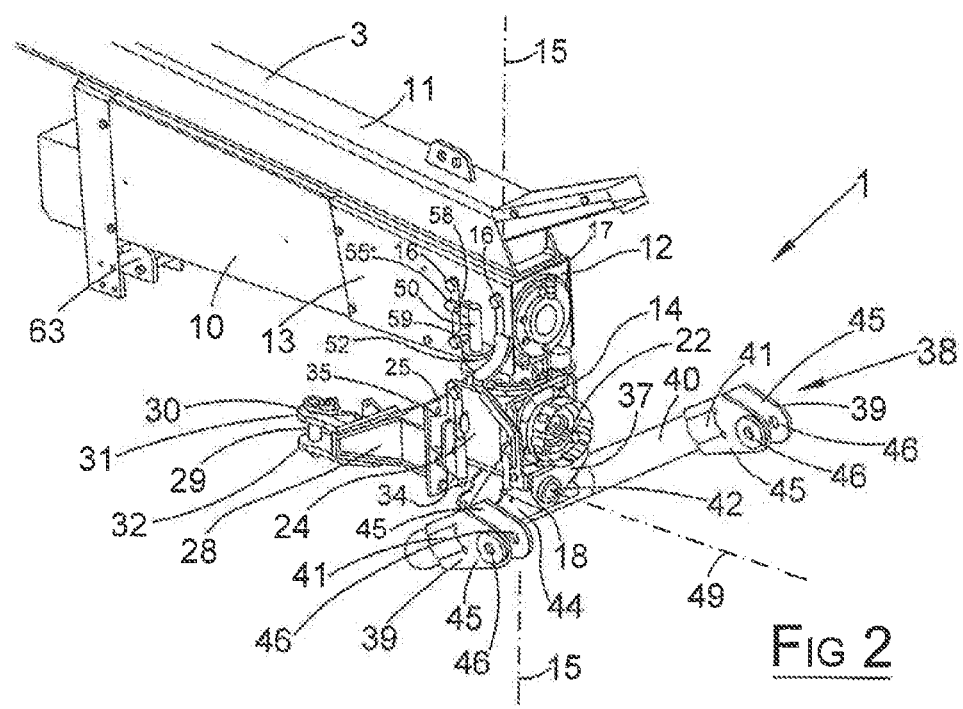
FIG. 2 is a perspective view of the attachment of FIG. 1 in a different state to that of FIG. 1.
Figure 3:
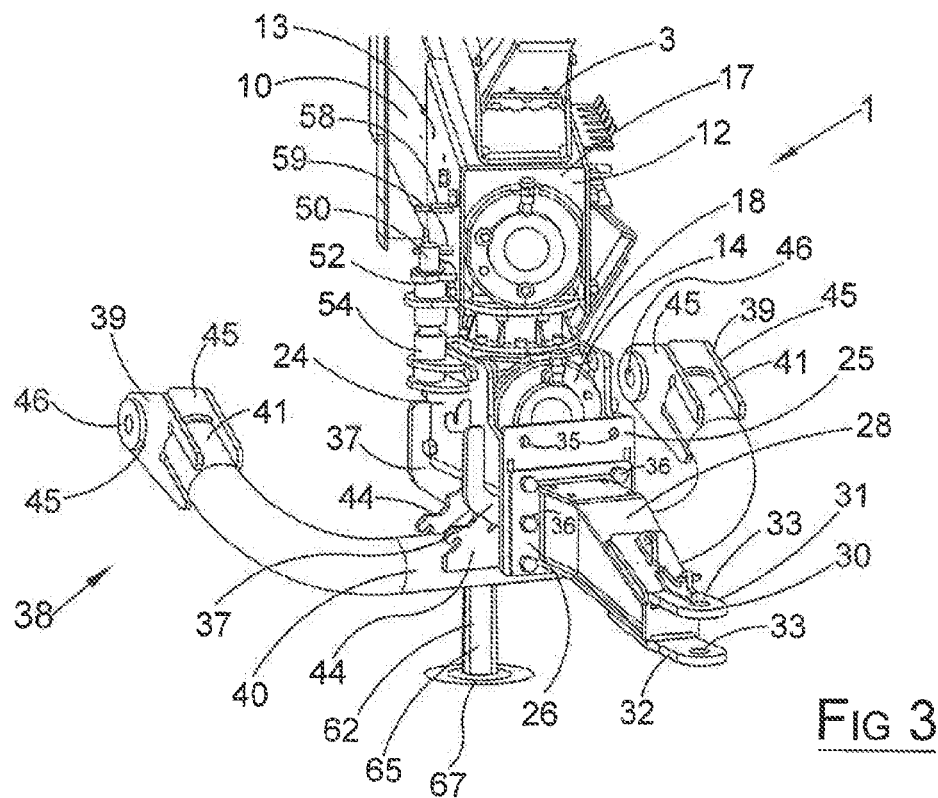
FIG. 3 is a front end perspective view of the attachment of FIG. 1 illustrating the attachment in the state of FIG. 1.
Figure 4:
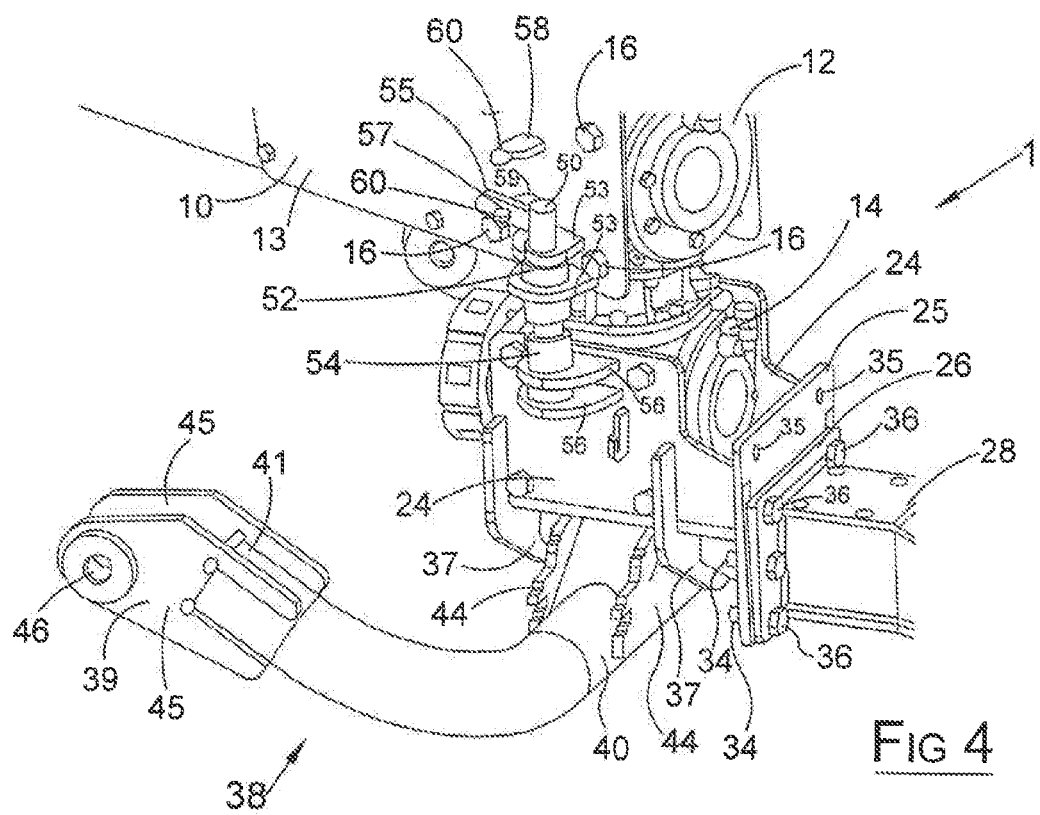
FIG. 4 is an enlarged perspective view illustrating a detail of the attachment of FIG. 1 in the state of FIG. 1.

The carrier arm 28 with the first hitch 30 and the carrier shaft 40 with the couplers 39 of the second hitch 38 are mounted on the carrier housing 24 of the second gearbox 14, so that as the second gearbox 14, and in turn the carrier housing 24 is rotated relative to the first gearbox 12 about the main pivot axis 15 through 180° between a first state illustrated in FIG. 1 and a second state illustrated in FIG. 2, the first hitch 30 and the second hitch 38 are alternately urged from respective inoperable states to operable states with the first and second hitches 30 and 38 alternately operably presented for coupling to the relative one of a road vehicle or the tractor 7. In FIG. 1 with the second gearbox 14 and the carrier housing 24 in the first state, the first hitch is in the operable state operably presented and ready for coupling to a road vehicle, while the second hitch 38 is in the inoperable state. In the second state of the second gearbox 14 and the carrier housing 24 illustrated in FIG. 2, the second hitch 38 is in the operable state operably presented with the couplers 39 ready for coupling to the lower lift arms 9 of the tractor 7, while the first hitch 30 is in the inoperable state.

A latch latches the second gearbox 14 and in turn the carrier housing 24 in the first state to the first gearbox 12 with the first hitch 30 presented in the operable state and the second hitch 38 in the inoperable state. The latch comprises a latch pin 50, which is slideable upwardly and downwardly in a mounting sleeve 52 secured to the mounting shaft 10 by brackets 53. The latch pin 50 is selectively engageable in a corresponding receiver sleeve 54 mounted on the carrier housing 24 by brackets 56. An operating lever 55 extending radially from the latch pin 50 is provided with an engagement slot 57, which is selectively engageable with each of a pair of vertically spaced apart retaining members, namely, an upper retaining member 58 and a lower retaining member 59 extending from the mounting shaft 10. The lower retaining member 59 is engageable with the engagement slot 57 of the operating lever 55 for retaining and securing the latch pin 50 in an engaged state, engaged in the receiver sleeve 54 for retaining the carrier housing 24 and in turn the second gearbox 14 in the first state. The upper retaining member 58 is engageable with the engagement slot 57 of the operating lever 55 for retaining and securing the latch pin 50 in a release state clear of the receiver sleeve 54 and disengaged therefrom for facilitating pivoting of the carrier housing 24 and the second gearbox 14 relative to the first gearbox 12. A clevis pin (not shown) is engageable with bores 60 extending through the upper and lower retaining members 58 and 59 for retaining the latch pin 50 secured in the release state and the engaged state, respectively.

A ground engaging support, in this embodiment of the invention an elongated ground engaging member 62, illustrated in FIGS. 1 and 5 is pivotally coupled to the mounting shaft 10 by a pivot mounting bracket 63, which is carried on a portion of the rear end wall 76 extending downwardly from the mounting shaft 10. The ground engaging member 62 is pivotal from an operable state illustrated in FIG. 1 extending downwardly from the mounting shaft 10 for engaging the ground and supporting the towbar 3 of the towable apparatus 5, to an inoperable state illustrated in FIG. 5 with the ground engaging member 62 extending forwardly and substantially parallel to the mounting shaft 10. The ground engaging member 62 comprises a pair of telescoping members, namely, an outer telescoping member 64 which is pivotally coupled to the pivot mounting bracket 63, and an inner telescoping member 65 which is slideable within the outer telescoping member 64. The inner telescoping member 65 terminates in a ground engaging plate 67 for engaging the ground. A screw-jack mechanism (not shown) is located within the telescoping members 64 and 65 for urging the telescoping members 64 and 65 longitudinally relative to each other for adjusting the length of the support member 62, in order to adjust the height of the towbar 3 of the towable apparatus 5 to a suitable height, for in turn setting the level of the appropriate one of the first hitch 30 or the second hitch 38 for hitching to the appropriate one of the road vehicle (not shown) or the tractor 7.

Figure 8:
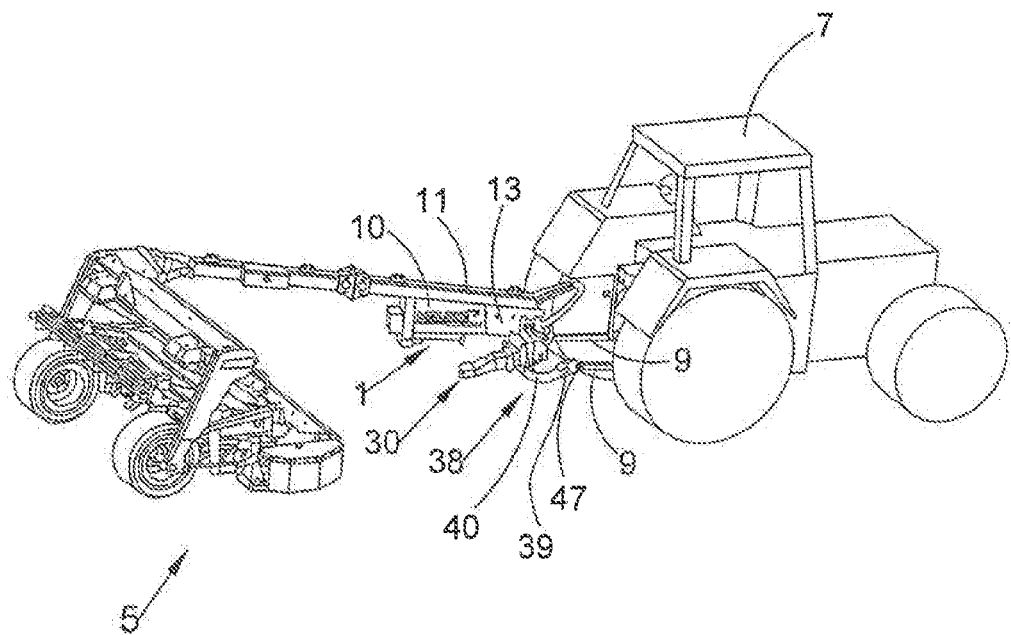
FIG. 8 is another perspective view of the mower of FIG. 7 coupled to an agricultural vehicle, namely, a tractor by the attachment of FIG. 1.

In use, with the attachment 1 secured by the mounting shaft 10 to the underside of the towbar 3 of the towable apparatus 5, the attachment 1 is ready for use. When it is desired to tow the towable apparatus 5 by a tractor, as illustrated in FIG. 8, if the second gearbox 14, and in turn, the carrier housing 24 are in the first state, and if the latch pin 50 is in the engaged state engaging the receiver sleeve 54, the latch pin 50 is urged from the engaged state to the release state disengaged from the receiver sleeve 54, and is secured in the release state by securing the lever 55 to the upper retaining member 58 by the clevis pin (not shown). The carrier housing 24 and the second gearbox 14 are then pivoted from the first state to the second state about the main pivot axis 15 with the second hitch 38 presented in the operable state ready for coupling to the tractor 7. The couplers 39 are then secured to the lower lift arms 9 of the tractor 7 by the connector pins 47, and the second splined shaft 22 of the second gearbox 14 is connected to the power-take-off shaft of the tractor 7 through, for example, a cardan shaft. The towable apparatus 5 and the tractor 7 are then ready for use.

As the towable apparatus 5 is being towed by the tractor 7 through a field, in the case of a mower, for mowing a crop therein, the second gearbox 14 and the carrier housing 24 are free to pivot relative to the first gearbox 12 about the main pivot axis in the normal manner in which the towbar of a towable apparatus such as a mower would pivot relative to a towing tractor during crop mowing. Additionally, as the towable apparatus 5 is being towed by the tractor 7, the carrier shaft 40 is pivotal about the carrier pivot axis 49 defined by the carrier pivot shaft 42 to accommodate tilting of the towable apparatus 5 from side-to-side relative to the tractor 7, in order to accommodate uneven ground being traversed by the tractor 7 and the towable apparatus 5.

When the work with the towable apparatus 5 has been completed, and it is desired to tow the towable apparatus 5 along a public road or public highway, the second hitch 38 and the splined shaft 22 of the second gearbox 14 are disconnected from the tractor 7. The second gearbox 14 and the carrier housing 24 are pivoted relative to the first gearbox 12 about the main pivot axis 15 through 180° from the second state to the first state with the first hitch 30 presented in the operable state and the second hitch 38 in the inoperable state. With the second gearbox 14 and the carrier housing 24 in the first state, the latch pin 50 is urged from the release state to the engaged state engaging the receiver sleeve 54 for retaining the carrier housing 24 and the second gearbox in the first state. The lever 55 is then secured to the lower retaining member 59 by the clevis pin (not shown).

The towable apparatus 5 is hitched to the road vehicle, for example, a pickup truck or a four-by-four road vehicle, by hitching the upper and lower hitch plates 31 and 32 to a hitch plate or plates of a corresponding hitch mechanism (not shown) of the road vehicle.

Thereafter, the towable apparatus 5 is towed along the public road or highway by the road vehicle in conventional fashion with the second gearbox 14 and the carrier housing 24 latched to the first gearbox 12 in order to prevent pivoting of the second gearbox 14 and the carrier housing 24 relative to the first gearbox 12. This therefore avoids pivoting of the first hitch 30 relative to the towbar 3 of the towable apparatus 5.

While the first and second elements have been described as comprising first and second gearboxes, while this is desirable when it is desired to transmit drive from the second element to the first element, it will be readily appreciated by those skilled in the art that where it is not necessary to transmit drive from the second element to the first element, the first and second elements may be provided by other suitable elements other than gearboxes, for example, the first element may comprise a first mounting plate, and a second element may comprise a second mounting plate which would be pivotally mounted relative to the first mounting plate about the vertically extending main pivot axis. The first mounting plate, would then be attached either directly to the towbar or to the towbar through a mounting element such as a mounting shaft or other suitable mounting means or system, and the first and second hitches would be coupled to the second mounting plate.

Alternatively, the first and second elements instead of comprising first and second gearboxes, may be provided in the form of first and second housings, which would be pivotal relative to each other about the main pivot axis, and the first and second housings may or may not be provided with right-angle drive transmissions, which would be connected to each other through a main drive transmission defining a drive transmission axis coinciding with the main pivot axis.

However, it will be appreciated that in cases where it is not necessary to transmit drive from the towing vehicle to the towable apparatus, the first and second housings may be provided without any drive transmission elements, be they right-angle drive transmissions or otherwise.

While the latch has been described as a latch pin engageable with a receiver, any other suitable latch or latching means could be provided for latching the carrier housing in the first state. Needless to say, it is envisaged that in some embodiments of the invention the latch may be provided for latching the carrier housing 24 in both the first state and the second state.

While it is desirable that the carrier shaft 40 should be pivotally coupled to the carrier housing by a carrier pivot shaft, to facilitate relative sideward tilting of the towable apparatus relative to the tractor, it will be readily apparent to those skilled in the art that pivoting of the carrier shaft relative to the carrier housing is not essential.

Needless to say, while specific first and second hitches have been described, other suitable first and second hitches may be provided instead of those described. It will also be appreciated that the first and second hitches may be adapted for coupling to other vehicles besides a road vehicle and/or a tractor.

While the first hitch has been described as comprising a pair of hitch plates for coupling to a complementary hitch mechanism of a towing vehicle, it will be appreciated that any other appropriate first hitch may be provided. For example, in cases where the first hitch is to be adapted for hitching to a hitch mechanism of a road vehicle, whereby the hitch mechanism of the road vehicle is in the form of a ball hitch, it is envisaged that the first hitch would be provided as a socket hitch for engaging the ball hitch of the road vehicle.

Needless to say, any other suitable type of second hitch may be provided and will be dependent on the hitch mechanism of the second type of towing vehicle to which the towable apparatus is to be hitched. For example, a fixed hitch extending rearwardly from a tractor and centred in a transverse direction between the rear ground engaging wheels of the tractor.

It will also be appreciated that the attachment according to the invention may be provided for securing to any towable apparatus or vehicle, be it an agricultural apparatus or implement or other type of towable apparatus or a towable vehicle such as a trailer.

The invention claimed is:

1. An attachment for a towbar of a towable apparatus, the attachment comprising:
    a first drive transmission element configured for securing to the towbar and for transmitting drive to the towable apparatus,
    a second drive transmission element pivotally coupled to the first drive transmission element about a main pivot axis and configured for receiving drive from a power-take-off shaft of a towing vehicle,
    a main drive transmission extending between the first drive transmission element and the second drive transmission element for transmitting drive from the second drive transmission element to the first drive transmission element and defining a drive transmission axis coinciding with the main pivot axis,
    a first hitch carried on the second drive transmission element, the first hitch being configured for hitching to a first type of a towing vehicle, the first hitch comprising a socket-hitch for engaging a corresponding ball-hitch of the first type of towing vehicle, or one or a pair of vertically spaced apart hitch plates configured for coupling to a corresponding hitch mechanism of the first type of towing vehicle,
    a second hitch carried on the second drive transmission element, the second hitch being different to the first hitch and being configured for hitching to a second type of towing vehicle different to the first type of towing vehicle, the second hitch comprising a pair of spaced apart couplers for coupling to respective lower lift arms of a three-point linkage of the second type of towing vehicle,
    the second drive transmission element being pivotal relative to the first drive transmission element about the main pivot axis between a first state presenting the first hitch in an operable state for hitching to the first type of towing vehicle, and a second state presenting the second hitch element in an operable state for hitching to the second type of towing vehicle, and permitting pivoting of the second hitch about the main pivot axis relative to the first drive transmission element, and
    a latch for releasably latching the second drive transmission element relative to the first drive transmission element in the first state thereof for preventing pivoting of the first hitch about the main pivot axis relative to the first drive transmission element.

2. The attachment as claimed in claim 1 in which the second drive transmission element is pivotal relative to the first drive transmission element about the main pivot axis through a rotational angle of approximately 180° between the first and second states.

3. The attachment as claimed in claim 1 in which the first drive transmission element comprises a first right-angle drive transmission gearbox, and the second drive transmission element comprises a second right-angle drive transmission gearbox.

4. The attachment as claimed in claim 3 in which the main drive transmission comprises a main drive shaft extending between the first and second gearboxes for transmitting drive from the second gearbox to the first gearbox, the main drive shaft defining the drive transmission axis.

5. The attachment as claimed in claim 1 in which the first hitch is adjustably mounted on the second drive transmission element, and is adjustable in a generally upwardly and downwardly direction relative to the second drive transmission element for adjusting the height of the first hitch relative to the attachment.

6. The attachment as claimed in claim 1 in which the couplers of the second hitch are carried on an elongated transversely extending carrier shaft, the carrier shaft being pivotally coupled to the second drive transmission element about a carrier pivot axis extending substantially horizontally and transversely of the carrier shaft.

7. The attachment as claimed in claim 1 in which the second drive transmission element is located below the first drive transmission element.

8. The attachment as claimed in claim 1 in which the first drive transmission element comprises a mounting element for mounting the attachment to the towbar of the towable apparatus.

9. The attachment as claimed in claim 8 in which the mounting element comprises a mounting shaft extending rearwardly from the first drive transmission element, configured for securing to the towbar of the towable apparatus.

10. The attachment as claimed in claim 1 in which an elongated ground engaging support member is coupled to the attachment.

11. The attachment as claimed in claim 10 in which the ground engaging support member is urgeable between an operable state extending downwardly for engaging the ground and an inoperable state spaced apart above the ground.

12. A towbar for a towable apparatus, the towbar comprising:
    an attachment for attaching the towbar to a towing vehicle, the attachment comprising
        a first drive transmission element secured to the towbar for transmitting drive to the towable apparatus,
        a second drive transmission element pivotally coupled to the first drive transmission element about a main pivot axis and configured for receiving drive from a power-take-off shaft of a towing vehicle,
        a main drive transmission extending between the first drive transmission element and the second drive transmission element for transmitting drive from the second drive transmission element to the first drive transmission element and defining a drive transmission axis coinciding with the main pivot axis,
        a first hitch carried on the second drive transmission element, the first hitch being configured for hitching to a first type of a towing vehicle, the first hitch comprising a socket-hitch for engaging a corresponding ball-hitch of the first type of towing vehicle, or one or a pair of vertically spaced apart hitch plates configured for coupling to a corresponding hitch mechanism of the first type of towing vehicle, a second hitch carried on the second drive transmission element, the second hitch being different to the first hitch and being configured for hitching to a second type of towing vehicle different to the first type of towing vehicle, the second hitch comprising a pair of spaced apart couplers for coupling to respective lower lift arms of a three-point linkage of the second type of towing vehicle, the second drive transmission element being pivotal relative to the first drive transmission element about the main pivot axis between a first state presenting the first hitch in an operable state for hitching to the first type of towing vehicle, and a second state presenting the second hitch element in an operable state for hitching to the second type of towing vehicle, and permitting pivoting of the second hitch about the main pivot axis relative to the first drive transmission element, and a latch for releasably latching the second drive transmission element relative to the first drive transmission element in the first state thereof for preventing pivoting of the first hitch about the main pivot axis relative to the first drive transmission element.

13. A towable apparatus comprising:

a towbar extending forwardly therefrom, and an attachment located adjacent a distal end of the towbar for attaching the towable apparatus to a towing vehicle, the attachment comprising:

a first drive transmission element secured to the towbar for transmitting drive to the towable apparatus, a second drive transmission element pivotally coupled to the first drive transmission element about a main pivot axis and configured for receiving drive from a power-take-off shaft of a towing vehicle, a main drive transmission extending between the first drive transmission element and the second drive transmission element for transmitting drive from the second drive transmission element to the first drive transmission element and defining a drive transmission axis coinciding with the main pivot axis, a first hitch carried on the second drive transmission element, the first hitch being configured for hitching to a first type of a towing vehicle, the first hitch comprising a socket-hitch for engaging a corresponding ball-hitch of the first type of towing vehicle, or one or a pair of vertically spaced apart hitch plates configured for coupling to a corresponding hitch mechanism of the first type of towing vehicle, a second hitch carried on the second drive transmission element, the second hitch being different to the first hitch and being configured for hitching to a second type of towing vehicle different to the first type of towing vehicle, the second hitch comprising a pair of spaced apart couplers for coupling to respective lower lift arms of a three-point linkage of the second type of towing vehicle, the second drive transmission element being pivotal relative to the first drive transmission element about the main pivot axis between a first state presenting the first hitch in an operable state for hitching to the first type of towing vehicle, and a second state presenting the second hitch element in an operable state for hitching to the second type of towing vehicle, and permitting pivoting of the second hitch about the main pivot axis relative to the first drive transmission element, and a latch for releasably latching the second drive transmission element relative to the first drive transmission element in the first state thereof for preventing pivoting of the first hitch about the main pivot axis relative to the first drive transmission element.

* * * * *